July 25, 1933.  F. RIEBER  1,919,480
TRANSLATING DEVICE
Filed Feb. 5, 1927   2 Sheets-Sheet 1

INVENTOR
Frank Rieber
BY White, Prost & Fryer
his ATTORNEYS

July 25, 1933.  F. RIEBER  1,919,480
TRANSLATING DEVICE
Filed Feb. 5, 1927   2 Sheets-Sheet 2
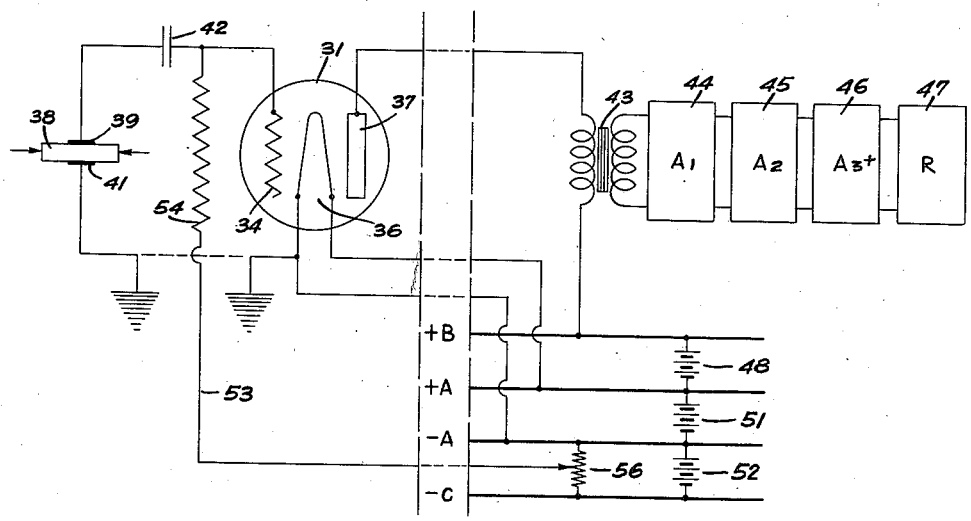
FIG_2_
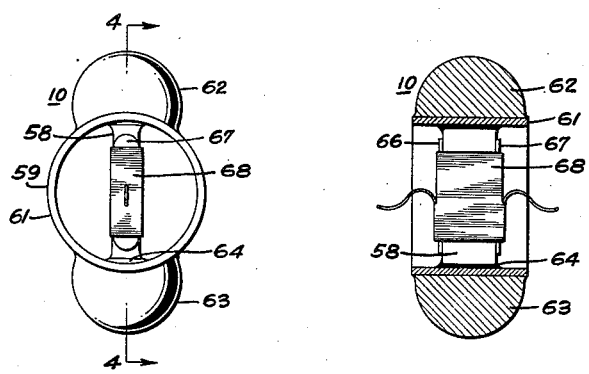
FIG_3_  FIG_4_
INVENTOR
Frank Rieber
BY
his ATTORNEYS Patented July 25, 1933

1,919,480

UNITED STATES PATENT OFFICE

FRANK RIEBER, OF BERKELEY, CALIFORNIA

TRANSLATING DEVICE

Application filed February 5, 1927. Serial No. 166,136.

This invention relates generally to a system and apparatus for translating mechanical shocks or vibrations into electrical current variations.

It is an object of this invention to devise a novel apparatus which may be placed in contact with a vibrating medium to translate mechanical vibrations into electrical current variations.

It is a further object of this invention to devise a novel means of incorporating an electron emission amplifier tube together with a piezo-electric cell so as to provide a unitary structure which may be employed to affect a remote receiver.

It is another object of this invention to devise means for increasing the sensitivity of substances exhibiting piezo-electric effects.

It is another object of this invention to devise a novel form of mounting for a piezo-electric crystal which will permit vibratory energy to be transmitted to the crystal and at the same time will prevent the crystal from being broken by mechanical stresses.

It is another object of this invention to improve upon repeater circuits or amplifier circuits for operation with piezo-electric crystals.

It is a further object of this invention to devise a novel apparatus for recording or detecting earth vibrations.

Further objects of this invention will appear from the following description in which I have set forth the preferred embodiment of my invention. It is to be understood that the appended claim is to be accorded a range of equivalents consistent with the state of the prior art.

Referring to the drawings:

Fig. 2 is a circuit diagram showing the maner in which the piezo-electric cell is connected to the amplifiers.

Fig. 3 is a side elevational view of one of the piezo-electric cells of this invention.

Fig. 4 is a cross sectional view taken on the line 4—4 of Fig. 3.

Figure 1:
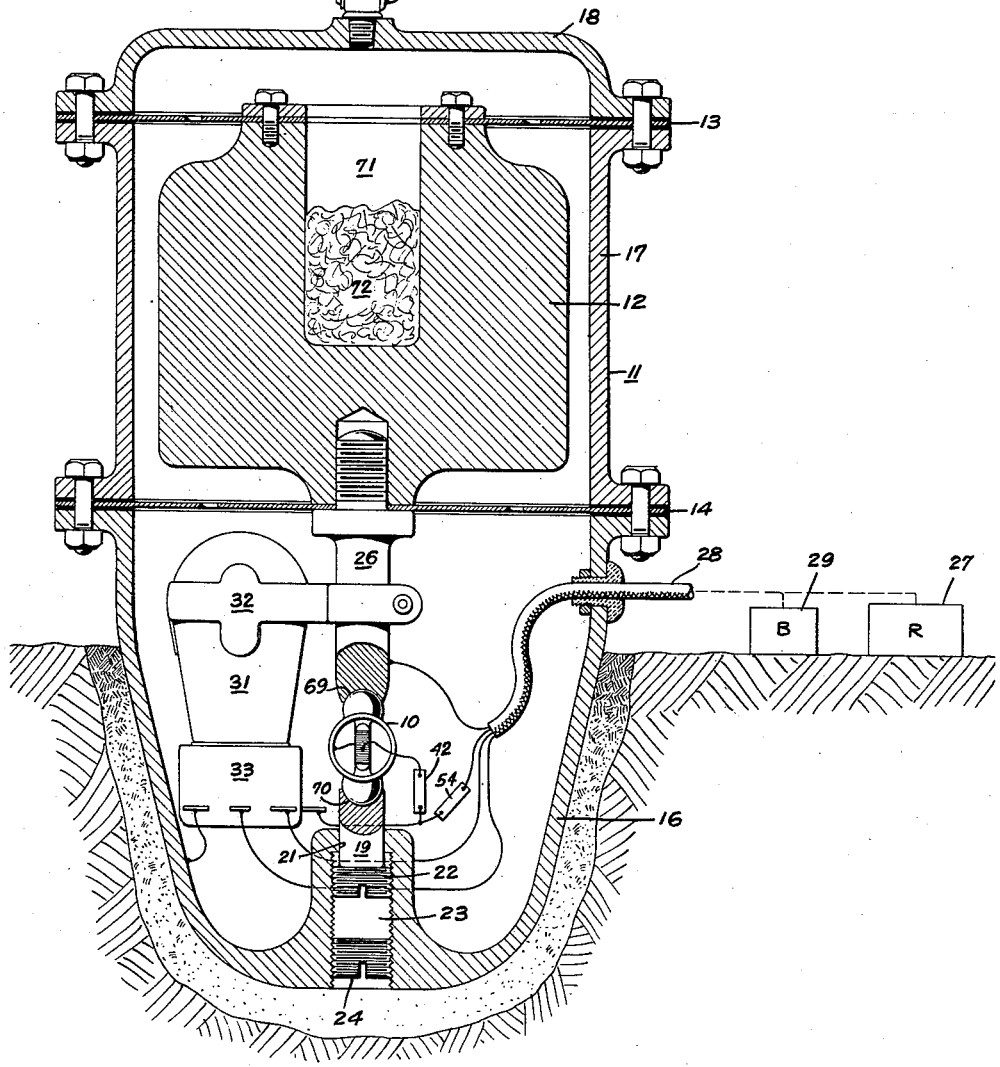
Fig. 1 is a transverse elevational view showing one form of apparatus for practicing this invention.

In this invention I have employed an apparatus which may be merely placed in abutting contact with a medium being vibrated, to cause these vibrations to be imposed upon an electric element which will translate these mechanical vibrations into current fluctuations or modulations. Thus referring to the drawings there is shown a pressure sensitive element 10, preferably of the piezo-electric type, which is disposed within a suitable casing 11. The element 10 has one portion in contact with means for transmitting mechanical vibrations, and another portion in contact with a relatively large mass 12. The inertia of mass 12 is preferably sufficiently great that this mass is practically unresponsive to vibrations of the frequencies which it is proposed to translate. This mass is preferably disposed within the casing 11 and is also provided with a yieldable or resilient mounting. One suitable way to mount the mass 12 is to provide flexible diaphragms 13 and 14 secured to the upper and lower ends of mass 12. These diaphragms may be conveniently mounted upon the casing as by clamping their peripheries between adjacent casing parts. Thus the casing has been shown as constructed with a lower vibration transmitting portion 16, and intermediate section 17 and a top portion 18. The periphery of diaphragm 13 may be clamped between the top portion 18 and intermediate section 17, while diaphragm 14 may be clamped between intermediate section 17 and the lower portion 16.

The lower casing portion 16 is intended to transmit mechanical vibrations to the piezo-electric cell 10 and is therefore in direct mechanical contact with this cell through suitable means such as a pin 19. To provide for adjustment of this pin it is preferably slidably disposed within the bore 21 and has its lower end in contact with an adjustable plug 22. For example this plug may be threaded into a bore 23 in the lower casing portion 16, this bore being normally closed by another threaded plug 24. Another portion of the piezo-electric cell 10 is in direct contact with a rigid member 26 which is fixed to the lower end of mass 12. For connecting the apparatus to a remote receiver 27 there is provided a flexible-multi-conductor cable 28 extending through one side of the casing. Batteries 29 may also be located a distance from the casing and connected to circuit conductors in cable 28, instead of locating batteries within the casing 11.

As previously explained the electrical element 10 is preferably a piezo-electric cell which directly transforms mechanical vibratory energy into electrical current. However the current generated by the piezo-electric cell is extremely minute and if the cell is located a distance from the receiver, the capacitative effect of the inter-connecting conductors and other losses imposed in the system will be sufficient to materially decrease the sensitivity and efficiency of the apparatus. This difficulty has been overcome in a novel manner by locating an amplifier device directly in the casing 11 in proximity to the piezo-electric cell 10, and the amplified current variations or modulations are then transmitted through conductors to the remote receiver. To avoid all microphonic noises caused by vibrations or shocks being transmitted to the electron emission amplifier tube which is employed, this tube is mounted directly on the mass 12 so that it will be immune from vibrations or shocks transmitted to the casing. Thus there has been shown an electron emission amplifier tube 31 which is secured as by means of a clamp 32, to the member 26. This amplifier tube is attached to the usual socket 33, the terminals of which are connected to the piezo-electric cell and to certain conductors of the cable 28.

The Fig. 2 more clearly shows the manner in which the amplifier tube is associated with the other apparatus. The particular tube which I employ includes a grid or control element 34, an electron emission element or filament 36, and plate or anode 37. The piezo-electric cell 38 has its electrical contacts 39 and 41 connected across grid 34 and electron emission element 36. In series with the circuit there is a grid condenser 42 which serves the purpose of preventing a normal direct current flow through the grid circuit. The output circuit which is connected across the plate and filament, includes the transformer 43, the output of which is preferably amplified by any number of amplifiers 44, 45 and 46 which are connected in cascade. The last amplifier supplies a suitable indicating device 47 such as a sensitive recorder. In case the mechanical vibrations received by the piezo-electric cell are of relatively high frequency, a detector or indicating device may be inserted between the last amplifier and the recorder. A "B" battery 48 is shown for energizing the output circuit and an "A" battery 51 for energizing the filament 36. It is also proposed to provide a relatively high negative bias upon the grid 34. In fact, the grid bias is preferably made sufficiently negative so that, during operation, the positive swing of the electro motive force generated by the piezo-electric cell will not be sufficient to bring the potential of the grid to a value where any appreciable grid current will flow. Under these conditions, the grid circuit will absorb substantially no energy from the piezo-electric cell, and a maximum of sensitivity will be attained. This negative bias may be conveniently provided by means of a "C" battery 52 to which is connected the grid lead 53 in series with a relatively high resistance 54. A potentiometer 56 is provided for adjusting the grid bias to the correct value.

In Figs. 3 and 4, I have shown a novel form of piezo-electric cell which I prefer to employ with the apparatus described above. This cell includes a member 58 exhibiting piezo-electric effects which is provided with a novel mounting 59. The member 58 may be any one of a number of substances which exhibit piezo-electric effects, that is substances which will generate an electrical current when stressed in a certain manner. Certain crystalline substances when compressed, develop a difference of potential between points on their surface. In order to take full advantage of this effect, the earliest investigators of this phenomenon discovered that it was best not to use an entire crystal, but rather to cut from such crystal a slab whose faces bore a definite relation to the stress axis and the electric axis. Rochelle salt crystals comprise one of the most sensitive of such substances, but have heretofore been neglected on account of their extreme fragility. Tourmaline and quartz, in spite of their much lower sensitivity, have been more generally used in devices of this sort on account of their durability. In my invention, while I may use tourmaline or quartz, I prefer to use slabs cut from Rochelle salt crystals, certain specific features of my invention enabling me to take full advantage of the higher sensitivity of this material and at the same time avoid the troubles ordinarily encountered due to the fragility of Rochelle salts. In the past piezo-electric cells constructed with a cut crystal slab of Rochelle salts have been impractical for anything except experimental purposes because of the delicate and fragile character of the crystals. They not only absorb moisture from the atmosphere and thus change their electrical characteristics, but they are able to withstand compression stresses, such as are required in operation, to a greater degree than torsional or bending stresses which will occur in handling and operation, and cause breakage unless specifically provided for in the mounting means. In this invention absorption of moisture from the atmosphere is prevented by enclosing the cell within either an individual casing or within the larger casing 11 shown in Fig. 1. The mounting for the member is constructed in such a way that during normal usage only compressional stresses will be transmitted to the crystal. Thus the member 58 is disposed in a casing in the form of a metal band 61 having spherical shaped abutments 62 and 63 fixed upon opposite sides. The member 58 is preferably aligned with abutments 62 and 63 and has its ends secured to the inner periphery of band 61 by means of a metallic amalgam 64 such as is commonly used by dentists. In securing the ends of member 58 with this amalgam, the ring 61 is first sprung to move abutments 62 and 63 apart a slight distance and then the amalgam is applied about the ends of member 58 and between the ends thereof and the adjacent periphery of the band. After the amalgam has completed its setting, the band is released so that abutments 62 and 63 move together slightly and member 58 is thus placed under a compressional stress. It has been found that by keeping the piezo-electric member slightly stressed in this manner during normal operation of the cell, the characteristics of the cell remain more uniform and the mechanical vibrations are more faithfully reproduced. The electrical contacts 66 and 67 are placed upon opposite sides of member 58 and may be retained thereon by means of a wrapping of cord 68. The spherical shaping of the abutments 62 and 63 is an important feature of the invention as it makes it impossible for tortional or bending stresses to be transmitted to the member 58 when the piezo-electric cell is coupled with other apparatus. Since crystals occasionally fail, mechanically, or deteriorate in use, this form of mounting has also the advantage that it permits of ready replacement of piezo-electric members, without otherwise disarranging the accessory apparatus. Thus as shown in Fig. 1 these spherical abutments are adapted to seat within complementary sockets 69 and 70 upon members 26 and 19 respectively. While the metal band 61 is sufficiently resilient to permit mechanical vibrations to be transmitted to the member 58, it also serves to adequately reinforce and protect this member. In my copending application Serial No. 55,202, filed September 8, 1926, another form of mounting for the piezo-electric crystal is disclosed which can be utilized with the translating device of this invention.

In developing piezo-electric crystals of the utmost sensitivity, I have found that the sensitivity of crystals may be increased by growing the crystals in a solution containing alcohol. For example a crystal of Rochelle salts will have a much higher sensitivity if grown in a solution containing methyl or ethyl alcohol, although it has been found that it gradually loses this increased sensitivity when exposed to the atmosphere probably because of evaporation of the alcohol. I have also found that the same sensitizing effect may be produced by keeping or exposing a crystal of Rochelle salts to a sensitizing atmosphere such as vapors of methyl or ethyl alcohol. In practice it is proposed to employ a crystal of Rochelle salts which has been grown in a solution containing methyl or ethyl alcohol and then keep this crystal in an atmosphere containing vapors of alcohol. This atmosphere may be conveniently maintained either by enclosing the piezo-electric cell in an individual casing and then arranging for the injection of alcohol or alcohol vapors within the casing, or the cell may remain exposed and an atmosphere maintained within the larger casing 11. For example in Fig. 1, I have shown a reservoir 71 in the mass 12, this reservoir containing a suitable absorbent substance 72 which is soaked with a volatile substance such as ethyl or methyl alcohol, which will create a sensitizing atmosphere. The casing is therefore entirely enclosed and the top portion 18 may be provided with a small petcock 73 for insertion of additional alcohol.

As this apparatus has special application for translating mechanical vibrations transmitted through the earth, the lower casing portion 16 has been shown as provided with a dome-shaped or curved surface which may be conveniently seated within a cavity in the earth. The earth immediately in contact with this casing portion is made as compact as possible, as by moistening with water. When vibrations are imparted to the casing from the earth, the mass 12 having relatively large inertia is practically unresponsive so that these vibrations are impressed upon the piezo-electric cell 10. The electrical potential variations generated by the cell are repeated by the amplifier tube 31 and transmitted through cable 28 to the receiver 27. The apparatus is specifically useful in receiving mechanical vibrations artificially imparted to the earth, for the investigation of stratification, etc.

I claim:

A device for translating mechanical vibrations into electrical current variations comprising a resiliently supported mass of large inertia, a member adapted to be vibrated, a piezo-electric cell, a ball and socket connection between the mass and one portion of the cell, and another ball and socket connection between said member and another part of the cell.

FRANK RIEBER.